(12) United States Patent
Yamashita

(10) Patent No.: US 7,864,842 B2
(45) Date of Patent: *Jan. 4, 2011

(54) TELEVISION RECEIVER INTEGRATED WITH RECORDING AND REPRODUCING DEVICE

(75) Inventor: Hiroshi Yamashita, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1456 days.

This patent is subject to a terminal disclaimer.

(21) Appl. No.: 11/270,887

(22) Filed: Nov. 9, 2005

(65) Prior Publication Data

US 2006/0133771 A1    Jun. 22, 2006

(30) Foreign Application Priority Data

Nov. 9, 2004    (JP)    ............................ P2004-324923

(51) Int. Cl.
*H04B 1/66* (2006.01)
*G06K 9/36* (2006.01)

(52) U.S. Cl. .................. 375/240.1; 375/134; 382/236

(58) Field of Classification Search .............. 382/155, 382/168, 189, 214, 232, 233, 235–252, 255, 382/260, 274, 275, 276, 305; 345/505; 386/111; 348/453, 552, 61; 375/134, 240, 243, 246
See application file for complete search history.

(56) References Cited

U.S. PATENT DOCUMENTS 7,298,419 B2 *  11/2007  Kaminosono ............. 348/552
7,659,900 B2 *   2/2010  MacInnis et al. .......... 345/505
7,675,541 B2 *   3/2010  Kondo ....................... 348/61
7,697,064 B2 *   4/2010  Komatsu ................... 348/453
2002/0037160 A1 * 3/2002  Locket et al. ............. 386/111

FOREIGN PATENT DOCUMENTS

| JP | 61-45278 | 3/1986 |
| JP | 2000-13805 | 1/2000 |
| JP | 2001-245244 | 9/2001 |
| JP | 2002-290894 | 10/2002 |
| JP | 2003-009192 | 1/2003 |
| JP | 2004-015115 | 1/2004 |
| JP | 2004-185776 | 7/2004 |
| JP | 2004-200907 | 7/2004 |

OTHER PUBLICATIONS

Patent Abstracts of Japan, Publication No. 2004-015115 dated Jan. 15, 2004 (1 page).
Patent Abstracts of Japan, Publication No. 2003-009192 dated Jan. 10, 2003 (1 page).
Japanese Office Action for Japanese Application No. 2004-324923, mailed on Apr. 8, 2008 (4 pages).

* cited by examiner

*Primary Examiner*—Seyed Azarian
(74) *Attorney, Agent, or Firm*—Osha • Liang LLP

(57) ABSTRACT

During watching television programs, a composite signal is converted into a digital broadcast video signal by a video decoder, and encoded into a Y/C signal by a video encoder and then, broadcast pictures are displayed on a monitor by using the Y/C signal. Further, when reproducing a DVD, reproduced pictures are displayed on the monitor by using the Y/C signal encoded from a reproduced video signal by a video encoder. When power is supplied, a CPU initializes a recorder section and instructs a CPU to display a message indicating that the initialization process is being performed on the monitor. The CPU on-screen displays the message on the monitor.

2 Claims, 4 Drawing Sheets

TELEVISION RECEIVER INTEGRATED WITH RECORDING AND REPRODUCING DEVICE

BACKGROUND OF THE INVENTION

1. Field of the Invention

The present invention relates to a television receiver integrated with a recording and reproducing device.

2. Description of the Related Art

Conventionally, when a television receiver integrated with a DVD recorder is turned on, initialization of the DVD recorder is performed beforehand so that DVD (Digital Versatile Disk) can be reproduced immediately when reproducing operation is performed. During the initialization process, determination whether an optical pickup is moved to a reference position or a DVD is set to a device is performed. Further, data consisting of several hundreds of K bites which is stored in a flash memory or processed data is stored in an internal register of an integrated circuit for recording and reproducing the data or a memory of a controller. Therefore, since short time is required to perform the initialization process (for example, 5 to 20 seconds based on types of devices), broadcast pictures are displayed on a monitor by using composite signals output from broadcasting receiver during the initialization process.

In JP-A-2003-9192 (Paragraphs [0001] to [0018]), a television receiver with a hard disc recorder built therein is disclosed as the following. Conventionally, when power is supplied, a boot-up process of the hard disc recorder is started, and a message "Please, wait for a while" is displayed on a monitor during the boot-up process. Further, after completing the boot-up process, it is possible to watch a broadcast program or reproduce the hard disc. However, in the above, when a problem occurs in the boot-up process, it is difficult to watch the broadcast program. Therefore, when supplying power, the boot-up process is started, and the device is set into a television mode so that the broadcast program can be watched even if the problem occurs in the boot-up process. Further, during the boot-up process, the state of the boot-up process is informed to a user by turning on or off two light-emitting diodes of a display unit. In JP-A-2004-15115 (Abstract and claim 1), a composite reproducing device in which a list of contents capable of being reproduced by a DVD reproducing device and a hard disc recording and reproducing device or broadcast programs capable of being received by a tuner is created to display on a display unit which is connected to an external device is disclosed.

SUMMARY OF THE INVENTION

In the meantime, in order to display clear broadcast pictures on a monitor, the broadcast pictures are not displayed by using a composite signal to be output from a broadcast receiver, but the broadcast pictures are preferably displayed by using a Y/C signal (which is an analog signal separated into a Y signal (luminance signal) and C signal (chroma signal)) which is converted by digitizing a composite signal by an integrated circuit for recording and reproducing a broadcast signal. In this case, however, when the broadcast pictures are displayed by using the composite signal during the initialization process of the DVD recorder and the display signal is changed into the Y/C signal after completing the initialization process as described in the related art, the broadcast pictures are not continuously displayed during the changing process, and the definition of the pictures changes to cause a uncomfortable feeling for a user.

Further, as disclosed in JP-A-2004-15115, even though it has been considered that the state of the initialization process is displayed by lighting on or off light-emitting diodes of a display unit without displaying on the monitor, it is not preferable to provide a display unit for the television receiver integrated with the DVD recorder in which the display is not required. Further, in JP-A-2003-9192, it is disclosed that a message representing "please, wait for a while" is displayed on the monitor, as a related art. However, it does not mean that a composite signal output from a broadcast receiver is converted into a Y/C signal by using an integrated circuit for recording and reproducing a broadcast signal to display pictures by using the Y/C signal.

The invention is made to solve the above-mentioned problems, and an object of the invention is to provide a television receiver integrated with a recording and reproducing device which is capable of displaying on a monitor without giving any uncomfortable feelings to a user and further displaying clear pictures for television broadcast.

A television receiver integrated with a recording and reproducing device according to the invention includes a video decoder that converts a composite signal output from a broadcast receiver into a digital signal to output the digital signal; a recording and reproducing unit that records the digital signal onto a DVD and reproduces data recorded on the DVD; a video encoder that converts the reproduced data or the digital signal into a Y/C signal to output the Y/C signal; a monitor that displays pictures; and a controller that controls individual units of the television receiver. The controller initializes the recording and reproducing unit, the video encoder, and the video decoder after supplying power. During the initialization process, the controller on-screen displays a message indicating that the initialization process is being performed on the monitor. After completing the initialization process, the controller controls the video encoder so as to convert the digital signal so that broadcast pictures are displayed on the monitor by using the Y/C signal. When the DVD is reproduced, the controller controls the video encoder so as to convert the reproduced signal so that the reproduced pictures are displayed on the monitor by using the Y/C signal. In here, the controller corresponds to a CPU 21 or a CPU 41, or an OSD processing unit 48 of an embodiment of the invention. Further, the recording and reproducing unit corresponds to a recording and reproducing unit 26, an MPEG2 encoder 27, and MPEG2 decoder 29 in the embodiment of the invention.

By doing so, during the initialization process of the recording and reproducing unit, etc. after supplying power, a message indicating that the initialization process is being performed is on-screen displayed on the monitor. After completing the initialization process, the broadcast pictures are displayed on the monitor by the Y/C signal or the component signal. Therefore, if problems occur when the broadcast pictures are displayed on a monitor by using the composite signal during the initialization process, and the broadcast pictures are displayed on a monitor by using the Y/C signal after completing the initialization process. That is, uncomfortable feeling for a user due to the change in the definition of the pictures or discontinuous broadcast pictures generated when the display signal is changed can be prevented. Further, the broadcast pictures are displayed on the monitor by using the Y/C signal or the component signal. Therefore, without any problems occurring when the broadcast pictures are displayed by the composite signal (for example, dot disturbance caused by a color signal which still remains in a luminance signal or cross-color caused when a color signal and a luminance signal are mixed with each other), clear television broadcast pictures can be displayed on the monitor. Furthermore, since the encoder used for producing the Y/C signal or the component signal is originally a device which records and reproduces a broadcast signal, the cost for an additional device is not needed. Furthermore, since a message indicating that the initialization process is being performed is on-screen displayed on the monitor, it is unnecessary to provide light-emitting diodes or a display tube in order to indicate the initializing state. As a result, the increase in cost of the device can be prevented.

In the embodiment of the present invention, the recording medium is a DVD, and broadcast pictures and reproduced pictures are displayed by using the Y/C signal between the Y/C signal and component signal. Therefore, a circuit for producing the component signal is not needed, and thus the cost of the device can be reduced.

According to the invention, during the initialization process of the recording and reproducing unit, etc. after supplying power, a message indicating that the initialization process is being performed is on-screen displayed on the monitor. After completing the initialization process, the broadcast pictures are displayed on the monitor by the Y/C signal or the component signal. Therefore, it is possible to display on a monitor without giving any uncomfortable feelings to a user and further display clear pictures for television broadcast.

DETAILED DESCRIPTION OF THE PREFERRED EMBODIMENTS

Figure 1:
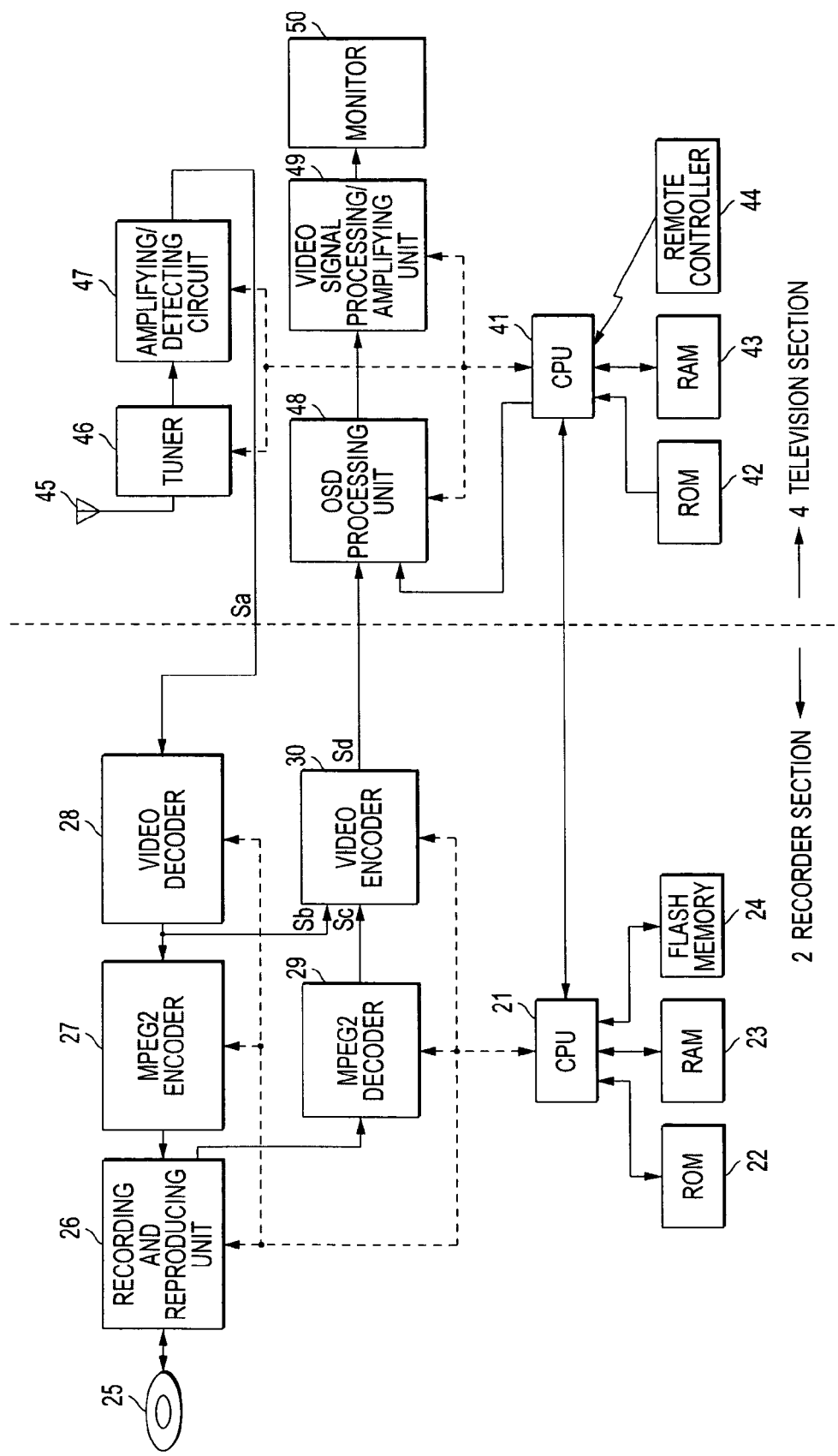
FIG. 1 is a block diagram showing a Television receiver integrated with a DVD recorder.

FIG. 1 is a block diagram showing a television receiver integrated with a DVD recorder (hereinafter, referred to as an apparatus) which is an example of a television receiver integrated with a recording and reproducing apparatus according to the present invention. The apparatus is configured by a DVD recorder section 2 (hereinafter, referred to as a recorder section 2) and a television receiver section 4 (hereinafter, referred to as a television section 4). In FIG. 1, broken lines terminating in arrow heads indicate flows of control signals. Moreover, since a process for television broadcast audio signal is not directly related to the invention, a diagrammatic representation and description thereof will be omitted.

The recorder section 2 includes a CPU 21, a ROM 22, a RAM 23, and a flash memory 24. The CPU 21 executes a program stored in the ROM 22 so as to control operations of individual units of the recorder section 2. In addition, the CPU 21 transmits and receives commands and data to and from a CPU 41 of the television section 4. The RAM 23 is used as a storage area in which various control data are stored and as an operating area for the CPU 21. Setup data for a recording/reproducing unit 26, an MPEG2 encoder 27, an MPEG2 decoder 29, a video encoder 30, and video decoder 28 is stored in a flash memory 24. When power is supplied, the CPU 21 reads these setup data to setup. Thereafter, the individual units the respective units perform desired operations in accordance with the setup.

The television section 4 also includes a CPU 41, a ROM 42 and a RAM 43. The CPU 41 executes a program stored in the ROM 42 so as to control an operation of individual units of the television section 4. The RAM 43 is used as a storage area, in which various control data and the like are stored, and as an operating area for the CPU 41. An on-screen display data is further stored in the ROM 42. The data includes data for displaying a predetermined message on the screen, or data for displaying another message on the screen. A remote controller 44 of the television section 4 is provided with a power switch, operation keys for recorder section 2 such as a play key and the like, and operation keys for television section 4 such as a channel selection key and the like. If an operation keys for television section 4 is pressed, the CPU 41 performs the process according to the pressed operation key. On the contrary, if an operation key for recorder section 2 is pressed, the CPU 41 transmits information concerning the operation key to the CPU 21 of the recorder section 2. The CPU 21 of the recorder section 2 receiving the information performs the process corresponding to the pressed operation key.

Next, a video signal will be described. A broadcast signal received by an antenna 45 is selected by a tuner 46 to be input into an amplifying/detecting circuit 47. The amplifying/detecting circuit 47 amplifies the input signal and then detects it so as to output a composite signal Sa which is an analog broadcast video signal. The video decoder 28 separates the composite signal Sa into one luminance signal and two color-difference signals, and then digitizes the signals so as to output a digital signal (a digital broadcast video signal) Sb. The digital broadcast video signal Sb is encoded in MPEG2 format by an MPEG2 encoder 27. Further, the encoded broadcast video signal is recorded onto a recordable DVD 25 (DVD-R or DVD-RW, etc.) by a recording and reproducing unit 26

The recording and reproducing unit 26 includes an optical pickup for writing and reading data into and from the DVD 25, a modulating circuit for modulating the encoded broadcast video signal into a write signal of the DVD 25, a demodulating circuit for demodulating a signal read from the DVD 25, a tray which carries the DVD 25 mounted thereon into the apparatus, and a rotary driving mechanism for rotating the DVD 25. Data of the DVD 25 reproduced by the recording and reproducing unit 26 is decoded by the MPEG2 decoder 29. The decoded signal, i.e. a reproduced video signal Sc is input into the video encoder 30. The above-described digital broadcast video signal Sb is also input into the video encoder 30. In accordance with the setup data which is set by the CPU 21, the video encoder 30 encodes the reproduced video signal Sc or the digital broadcast video signal Sb into a Y/C signal Sd to output it. The Y/C signal Sd is an analog video signal composed of a Y signal (luminance signal) and a C signal (chroma signal).

An OSD processing unit 48 outputs an overlapping signal of an on-screen display signal which is transmitted from a CPU 41 and a Y/C signal Sd output from the video encoder 30. The on-screen display signal is generated from the on-screen display data stored in the ROM 42 by the CPU 41. Even though it is disclosed that the CPU 41 transmits the on-screen display signal, the signal is transmitted from a circuit which is not shown, as a matter of fact. A video signal processing/amplifying unit 49 extracts a vertical synchronizing signal, a horizontal synchronizing signal, and R, G, B signals from the output signal of the OSD processing unit 48 and then amplifies the extracted signals to output. The monitor 50 is driven on the basis of the amplified signals, so that real-time broadcast pictures, reproduced pictures of the DVD 25, and the on-screen display are displayed on the monitor 50.

Figure 2:
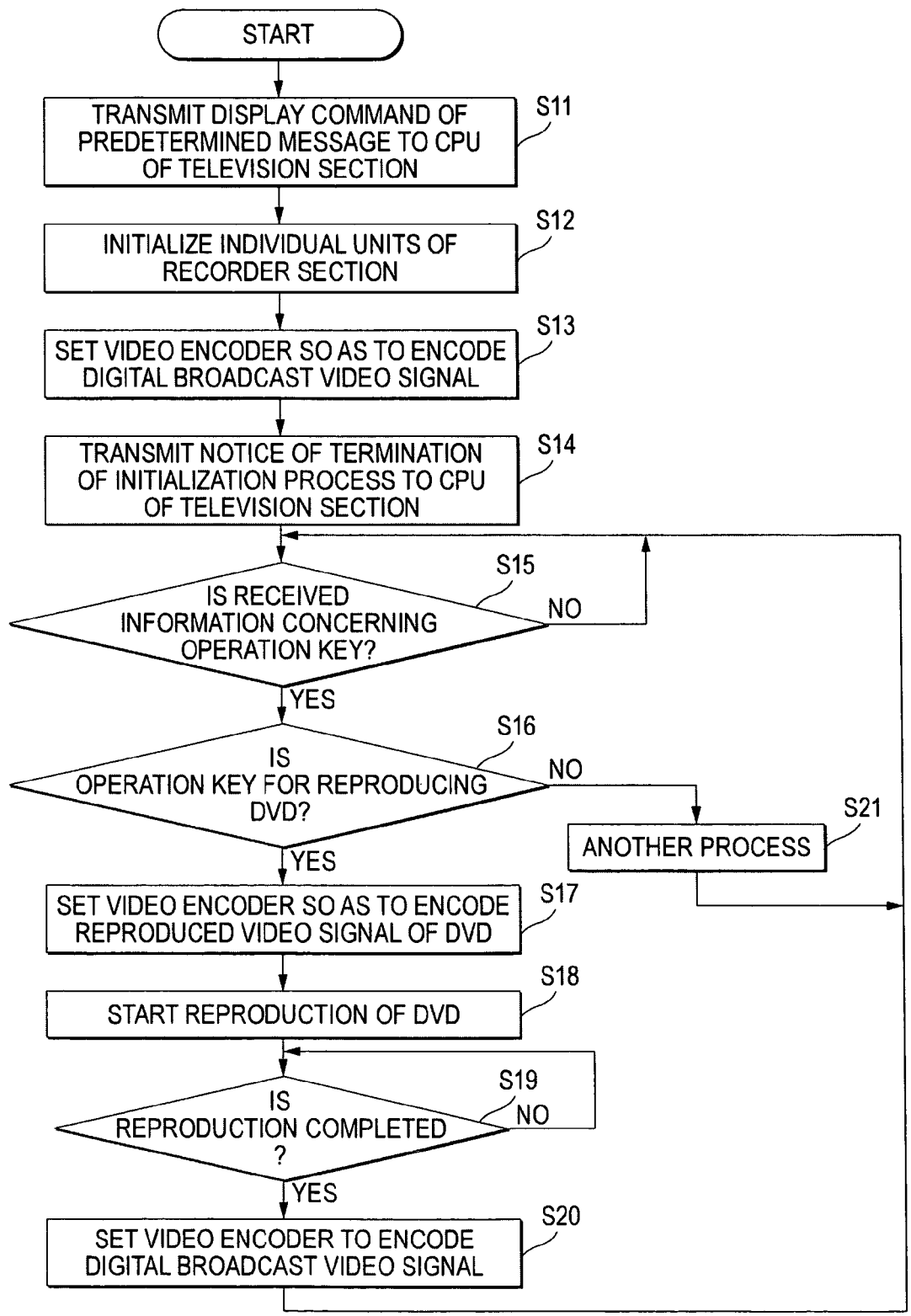
FIG. 2 is a flow chart showing an operation of a recorder section.
Figure 3:
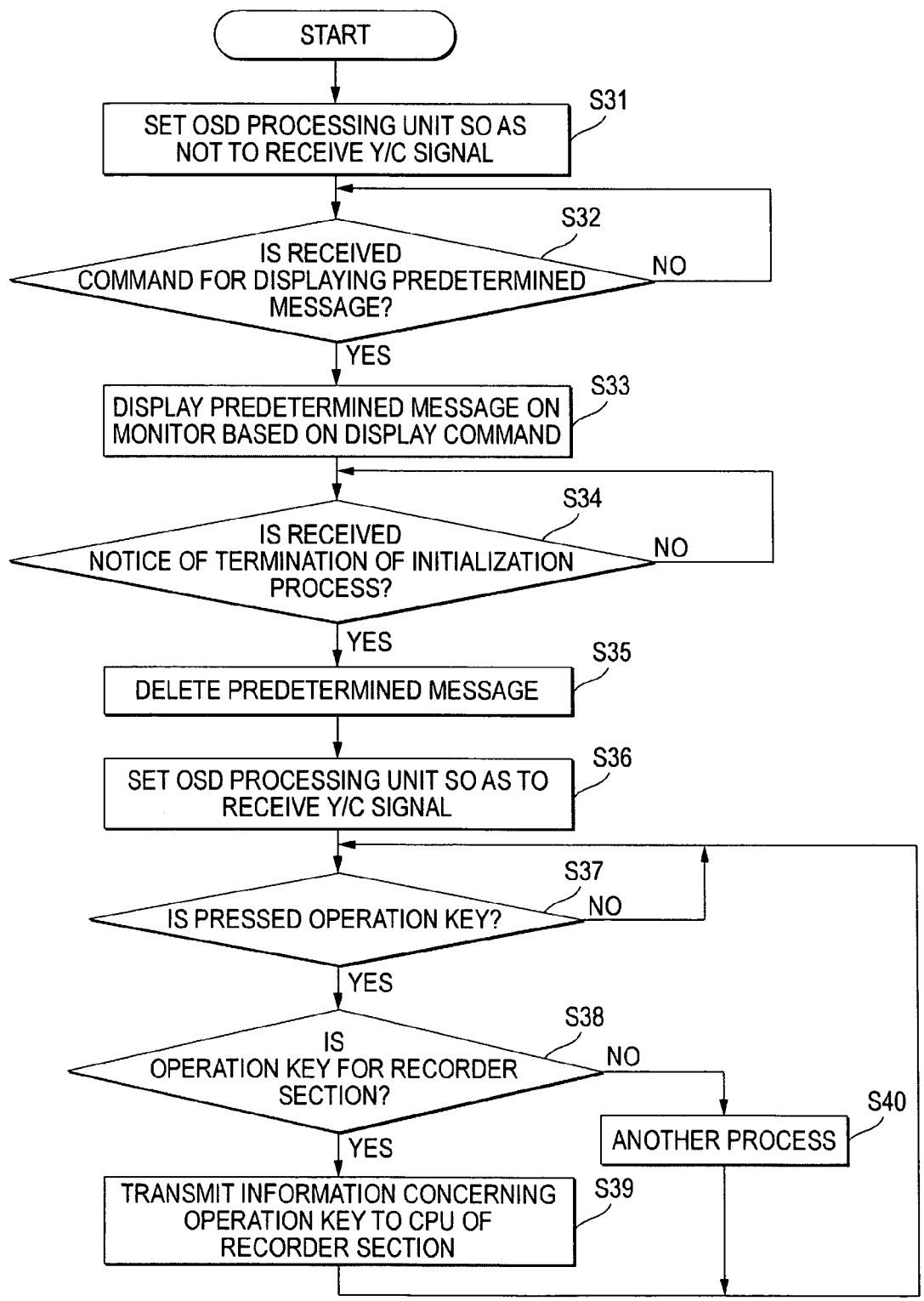
FIG. 3 is a flow chart showing an operation of a television section.

Next, an operation of the apparatus will be described. FIG. 2 is a flow chart showing an operation of the recorder section 2, and FIG. 3 is a flow chart showing an operation of the television section 4. First, an operation of the recorder section 2 will be described with reference to FIG. 2. If power is supplied, in order to on-screen display a predetermined message (for example, 'Please, wait for a while') indicating that the initialization process of the decoder is being performed, the CPU 21 transmits a display command to a CPU 41 of a television section 4 (S11). In this time, a message number of the predetermined message is also transmitted.

After transmitting the display command, the CPU 21 initializes the individual units of the recorder section 2 (S12). In this initialization process, the CPU 21 reads data stored in the flash memory 24 and setup the data into a setting unit such as resistors of the recording/reproducing unit 26, the MPEG2 encoder 27, the MPEG2 decoder 29, the video encoder 30, and the video decoder 28 or the RAM 23 so that the recorder section 2 performs a predetermined operation. Control data for a recorder section 2 is set into the RAM 23. In this case, read data is processed if necessary, and the processed data is set. In this case, the CPU 21 moves the optical pickup of the recording and reproducing unit 26 to a reference position. If the DVD 25 is loaded on the tray of the recording and reproducing unit 26, in order to immediately display a title menu recorded in the DVD 25 when the menu key of the remote controller 44 is pressed, a required portion of the DVD 25 is reproduced to store data for using menu display in the RAM 23.

When completing the initialization process, the CPU 21 sets the video encoder 30 so as to encode a digital broadcast video signal Sb into a Y/C signal Sd (S13). Thereby, when the DVD 25 is not reproduced, real-time broadcast pictures are displayed on the monitor 50 by using the Y/C signal Sd. Further, the CPU 21 transmits a notice of termination of the initialization process to the CPU 41 of the television section 4 (S14). In here, the CPU 21 waits until receiving information concerning the operation key from the CPU 41 of the television section 4 (S15). When receiving the information concerning the operation key (S15: YES), the CPU 21 determines whether the corresponding operation key is an operation key for reproducing the DVD 25 or not (S16).

When the corresponding operation key is an operation key for reproducing the DVD 25 (S16: YES), the CPU 21 sets the video encoder 30 so as to encode the reproduced video signal Sc into the Y/C signal Sd (S17), and starts the reproduction of the DVD 25 by operating a rotary driving mechanism of the recording and reproducing unit 26 (S18). As a result, the reproduced pictures of the DVD 25 are displayed on the monitor 50 by using Y/C signal. When the reproduction of the DVD 25 is completed (S19: YES), the CPU 21 sets the video encoder 30 so as to display the broadcast pictures on the monitor 50 and encode the digital broadcast video signal Sb into the Y/C signal Sd (S20), and enters into a waiting state for receiving again the information concerning the operation key (S15). When the received information of the operation key does not concern the operation key for reproducing the DVD 25 (S16: NO), the CPU 21 performs another processes (for example, a process of recording broadcast video signals on the DVD 25 when the corresponding operation key is the recording key) (S21), and enters into a waiting state for receiving again the information concerning the operation key (S15).

Figure 4:
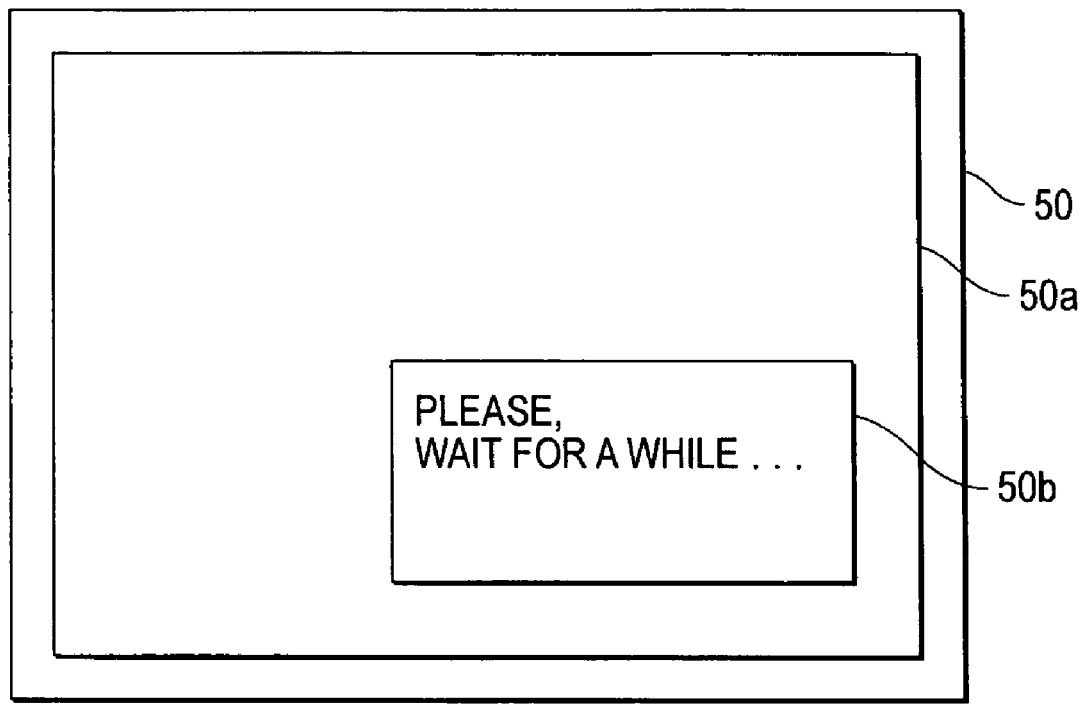
FIG. 4 is a view showing on-screen display displayed on a monitor.

Next, an operation of the television section 4 will be described with reference to FIG. 3. If power is supplied, the CPU 41 sets the OSD processing unit 48 so as not to receive the Y/C signal output from the video encoder 30 (S31). Instead of them, the CPU 41 may set the video encoder 30 so as for the CPU 21 of the recorder section 2 not to output a signal. As a result, the monitor 50 becomes a not-display state (the monitor 50 is in a dark black state). Thereafter, when receiving a command for displaying a predetermined message from the CPU 21 of the recorder section 2 (S32: YES), the CPU 41 generates an on-screen display signal from data for on-screen display corresponding to a number of a message included in the display instruction to output it. By sending the on-screen display signal to the OSD processing unit 48, the predetermined message is displayed on the monitor 50 (S33). FIG. 4 is a view showing the on-screen display 50b displayed on the screen 50a of the monitor 50, and a portion other than the on-screen display 50b of the screen 50a is in a non-display state.

Thereafter, when receiving a notice of termination of the initialization process from the CPU 21 of the television section 2 (S34: YES), the CPU 41 stops to output the on-screen display signal to delete the message (on-screen display 50b) from the monitor 50 (S35). Further, the CPU 41 sets the OSD processing unit 48 so as to receive Y/C signal Sd output from the video encoder 30 (S36). At that time, the video encoder 30 is set so as to encode the digital broadcast video signal Sb into the Y/C signal Sd (see S13 of FIG. 2), broadcast pictures of a broadcast channel selected by the tuner 46 is displayed on the monitor 50.

Then, the CPU 41 waits for an operation key of the remote controller 44 to be pressed (S37). If an operation key is pressed (S37: YES), the CPU 41 determines whether the operation key is an operation key for recorder section 2 or not (S38). When the operation key is an operation key for recorder section 2 (S38: YES), the CPU 41 transmits information concerning the operation key to the CPU 21 of the recorder section 2 (S39), and again waits for an operation key to be pressed (S37). When the operation key is not an operation key for recorder section 2 (S38: NO), that is, when the operation key is an operation key for television section 4, the CPU 41 performs another processes (for example, a process of setting the selected broadcast channel to the tuner 46 when the channel selection key is pressed) (S37), and again waits for an operation key to be pressed (S40).

To summarize the above description, during power is supplied to the apparatus to perform the initialization process of the individual units of the recorder section 2, a predetermined message representing that the initialization process is being performed is on-screen displayed on the monitor 50. Further, after completing the initialization process, broadcast pictures are displayed on the monitor 50 by using the Y/C signal Sd encoded from the digital broadcast video signal Sb. Thereby, monitor display can be performed without giving any uncomfortable felling to the user and clear broadcast pictures can be displayed on the monitor 50. On the other hand, during reproducing the DVD 25, the reproduced pictures of the DVD 25 is displayed on the monitor 50 by using the Y/C signal encoded from the reproduced video signal Sc.

In the above described embodiment, the digital broadcast video signal Sb to be output by the video decoder 28 is encoded by the video encoder 30, thereby producing the Y/C signal Sd.

Instead of them, the present invention can be also embodied by the following method. A signal to be output by the MPEG2 encoder 27 is input into the MPEG2 decoder, thereby obtaining the Y/C signal Sd. In this case, the video decoder 28 and MPEG2 encoder 27 correspond to the video decoder of the invention, and the video encoder 30 and MPEG2 decoder 29 correspond to the video encoder of the invention. In the above described embodiment, pictures are displayed on the monitor 50 by the using Y/C signal Sd. Instead of them, a video encoder producing an analog composite signal composed of one luminance signal and two color-difference signals $C_R$ and $C_B$ may be adopted, so that video is displayed on the monitor 50 by the composite signal.

In the above-described embodiment, a recording medium is the DVD 25. However, a recording medium may be, for example, an optical disc such as CD-RW or a hard disc other than the DVD 25. Further, in the above-described embodiment, a single tuner 46 is used. However, the present invention can be embodied for a case that an additional tuner is provided for the recorder section 2 so as to record a program on a different channel. Further, in the above-described embodiment, the case has been described where the recorder section 2 is controlled by the CPU 21 and the television section 4 is controlled by the CPU 41. However, the record section 2 and television section 4 may be controlled by only one CPU.

What is claimed is:

1. A television receiver integrated with a recording and reproducing device, comprising:
   a video decoder that converts a composite signal output from a broadcast receiver into a digital signal to output the digital signal;
   a recording and reproducing unit that records the digital signal onto a DVD and reproduces data recorded on the DVD;
   a video encoder that converts at least one of the reproduced data and the digital signal into a Y/C signal to output the Y/C signal;
   a monitor that displays pictures; and
   a controller that controls individual units of the television receiver,
   wherein the controller initializes the recording and reproducing unit, the video encoder, and the video decoder after supplying power,
   during the initialization process, the controller on-screen displays a message indicating that the initialization process is being performed on the monitor,
   after completing the initialization process, the controller controls the video encoder so as to convert the digital signal so that broadcast pictures are displayed on the monitor by using the Y/C signal, and
   when the DVD is reproduced, the controller controls the video encoder so as to convert the reproduced signal so that the reproduced pictures are displayed on the monitor by using the Y/C signal.

2. A television receiver integrated with a recording and reproducing device, comprising:
   a video decoder that converts a composite signal output from a broadcast receiver into a digital signal to output the digital signal;
   a recording and reproducing unit that records the digital signal onto a recording medium and reproduces data recorded on the recording medium;
   a video encoder that converts at least one of the reproduced data and the digital signal into a Y/C signal to output the Y/C signal;
   a monitor that displays pictures; and
   a controller that controls individual units of the television receiver,
   wherein the controller initializes the recording and reproducing unit, the video encoder, and the video decoder after supplying power,
   during the initialization process, the controller on-screen displays a message indicating that the initialization process is being performed on the monitor,
   after completing the initialization process, the controller controls the video encoder so as to convert the digital signal so that broadcast pictures are displayed on the monitor by using the Y/C signal or a component signal, and
   when the recording medium is reproduced, the controller controls the video encoder so as to convert the reproduced signal so that the reproduced pictures are displayed on the monitor by using the Y/C signal or the component signal.

* * * * *